United States Patent [19]
Slominski et al.

[11] Patent Number: 5,581,689
[45] Date of Patent: Dec. 3, 1996

[54] MULTI LINK TYPE SELF HEALING SYSTEM FOR COMMUNICATION NETWORKS

[75] Inventors: Miroslaw M. Slominski; Hiroyuki Okazaki, both of Tokyo, Japan

[73] Assignee: NEC Corporation, Tokyo, Japan

[21] Appl. No.: 365,449

[22] Filed: Dec. 28, 1994

[30] Foreign Application Priority Data

Dec. 28, 1993 [JP] Japan .................................. 5-337932
Sep. 22, 1994 [JP] Japan .................................. 6-228036

[51] Int. Cl.$^6$ ............................ G01R 31/28; G06F 11/00
[52] U.S. Cl. ....................................................... 395/182.02
[58] Field of Search ........................... 395/182.02, 180, 395/181, 182.01

[56] References Cited

U.S. PATENT DOCUMENTS

| | | | |
|---|---|---|---|
| 4,956,835 | 9/1990 | Grover | 370/16 |
| 5,173,689 | 12/1992 | Kusano | 395/182.02 X |
| 5,218,601 | 6/1993 | Chujo | 395/182.02 X |
| 5,371,744 | 12/1994 | Campbell | 395/182.02 |

OTHER PUBLICATIONS

Kawamura et al., "Self–healing ATM Network Techniques Utilizing Virtual Paths", Networks '92, May 1992, pp. 129–134.

Fujii et al., "Transfer Mechanisms and Operation of Self-healing Algorithms in ATM Networks", NTT Telecommunication Networks Laboratories, pp. 231–241.

Primary Examiner—Robert W. Beausoliel, Jr.
Assistant Examiner—Glenn Snyder
Attorney, Agent, or Firm—Foley & Lardner

[57] ABSTRACT

Restoration guide information is set on design of a network in data bases of terminal nodes of a current path. When a failure is detected during operation, establishment of a restoration path is tried by connecting a series of adjacent mergers in accordance with the restoration guides. If connection of adjacent mergers according to the restoration guides is impossible due to a multiple failure, the connection is tried by using associate mergers. When the restoration path is reestablished from an associate merger to the merger, similar processes are repeated. If two or more restoration paths are obtained during progress of restoration, one final restoration path is selected for use in the restoration in accordance with a predetermined reference. Link resources are released except for those connected in the final restoration path.

9 Claims, 11 Drawing Sheets

CURRENT PATH PP = (PP', PP"), WHERE PP' = (g, m, s) AND PP" = (s, m, g)

MERGER-MERGER CONNECTION AS PART OF RR = (RP', RP"), WHERE RP' = (g, h, n, s) AND RP" = (s, r, l, g)

MERGER-ASSOCIATE MERGER CONNECTION AS PART OF RR WHEN ALLOWABLE MAXIMUM NUMBER OF ASSOCIATE MERGERS IS EQUAL TO TWO

MULTI LINK TYPE SELF HEALING SYSTEM FOR COMMUNICATION NETWORKS

BACKGROUND OF THE INVENTION

This invention relates to a self healing system for restoring a communication network assigned with cross-connect functions from various failures and, more particularly, for currently used paths, each between a source and a destination node of communication.

(Prior Art)

Such a self healing system has hitherto been devised or used in order to restore communication services from network failures caused by faults in links or nodes.

Upon occurrence of a failure in a currently used path, a restoration path must be established in the network in order to avoid a break in communication. For this self heal, the network is preliminarily assigned with capacities and like reserved resources. The reserved resources are controlled for self heal of a failure, which may take place, according to either a centralized control scheme or a distributed control scheme.

According to the centralized control scheme, failure situations of the network are transmitted to a specific central control node. Based on such accumulated information, calculated is a route of an optimum restoration path, namely, a self heal countermeasure.

According to the distributed control scheme, no central control node is used. Instead, control signals are sent and received at nodes of the network to autonomously and distributedly search for a restoration path. Reported is a restoration performance composed of various numbers of phases. It will be assumed here that two phases are used. In a first phase (a broadcast phase), a sender (a first terminal node which is determined in the currently used path prior to occurrence of a failure) detects a failure and sends a restoration signal to all adjacent links which satisfy restoration requirements. This operation is repeated until a chooser (a second terminal node of the currently used path subjected to the failure) receives the restoration signal. In a second phase (a connection phase), the chooser selects a restoration path from tested paths and sends a connection signal through a decided route. This is in order to establish the restoration path. In this manner, the restoration signal and the connection signal are twice sent and received at both path terminal nodes to complete self heal of the path.

In contrast, a self healing system is proposed in a paper contributed by Ryutaro Kawamura, Ken-ichi Sato, and Ikuo Tokizawa to the Proceedings of 5th International Network Planning Symposium (Networks '92), pages 129 to 134, May 1992, under the title of "Self Healing ATM Network Techniques Utilizing Virtual Paths", wherein two algorithms are proposed to shorten a time of restoration. In an algorithm 1 (Flood-Connecting algorithm), the broadcast phase and the connection phase are degenerated into only one phase. In another algorithm 2 (Pre-assigned backup VP algorithm), a restoration path is preassigned to the currently used path to send a message only to the restoration path when a failure takes place. Should a multiple failure occur so as to render the restoration path unavailable, the failure is tried for restoration in accordance with the algorithm 1 between the terminal nodes of the currently used path.

(Tasks to Be Solved by the Invention)

With the conventional centralized control method, it is possible to optimize the self heal based on information of the network as a whole and to economize the self heal. It, however, takes time to collect the information at the central control node, to calculate the countermeasure for the self heal, and to transmit switching information to all nodes. This gives rise to a task of unavoidance of an appreciably long self heal time.

With the algorithm 1 which is an improvement in the conventional distributed control scheme, it is possible to achieve a short self heal time. It is, however, indispensable to transfer control signals to all adjacent nodes which are available. This results in transfer of an enormous number of control signals in the network for the self heal. It is unavoidable to temporarily establish a plurality of restoration paths for one currently used path to use link resources in vain. This may result in no serious problem for an isolated failure. This, however, results in the multiple failure in congestion of the control signals for the self heal and in deterioration of performance of a self heal rate and of the restoration time to give rise to an instability reported in a paper contributed by Hiroyuki Fujii and Noriaki Yoshikai to the Proceedings of NOMS 92, pages 231 to 241, 1992, under the title of "Transfer Mechanism and Operation of Self-Healing Algorithms in ATM Networks". Alternatively, this results in a task of complexed control because the multiple failure must be traded off by assignment of a priority degree to messages for the self heal.

With the algorithm 2 which is another improvement in the conventional distributed control scheme, restoration is scheduled in the multiple failure according to the algorithm 1. As a consequence, a task is involved in the case of the multiple failure.

It is consequently an object of the present invention to provide a novel self healing system having merits of the centralized control scheme and the distributed control scheme to attain advantages of these both schemes and to remove the above-mentioned defects.

SUMMARY OF THE INVENTION

A first multi link type self healing system of this invention is for a communication network composed of a plurality of Modes assigned with cross-connect functions and a plurality of links connecting the nodes to provide current paths, each current path between a source and a destination node of the nodes through at least one of the links and is characterised in that:

each of the current paths is accompanied by at least one restoration path represented by a merger list composed of the source and the destination nodes of the above-mentioned each current path and the nodes other than the nodes included in the above-mentioned each current path;

each of the source and the destination nodes of the above-mentioned each current path being provided with a data base loaded with information necessary for restoration;

the nodes comprising restoration control means for confirming, connecting, and releasing resources of ones of the links that are connected.

A second multi link type self healing system of this invention is characterised in the first multi link type self healing system in that:

self heal control signals accumulated in the data base with the restoration path inclusive are sent and received between mergers of the restoration path when a failure takes place in the current path;

the restoration control means establishing for restoration an alternative route in the at least one restoration path for one of the current paths that is subjected to the failure;

the self heal control signals being sent and received between a merger and the nodes other than the merger when the at least one restoration path and can not be used as the alternative route;

the restoration control means being used to reestablish an unusable merger section for restoration of one of the current paths that is subjected to the failure.

A third multi link type self healing system of this invention is characterised in the first multi link type self healing system in that:

the data base is loaded with restoration guides comprising for the current paths the merger list, link resources necessary for restoration of the failure, and, when the restoration path is unusable on restoration of the failure, a maximum allowable number of associate mergers for use in reestablishing the restoration path;

a failure indication signal inclusive of the above-mentioned one of current paths being changed to a setup signal including the restoration guides to use the source and the destination nodes of each current path as control objective nodes and to begin assignment of the at least one restoration path at the control objective nodes;

the restoration control means confirming responsive to the restoration guides the link resources between the merger used as each control objective node and an adjacent merger to connect a link section if the link resources are usable, to add the control objective nodes to the setup signal as a restoration path, and to transmit the setup signal with the adjacent merger used as a fresh control objective node;

the restoration control means confirming responsive to the restoration guides the link resources between the merger used as each control objective node and an adjacent merger to use, if the link resources are not usable but if the link resources relative to the nodes other than the adjacent merger are usable, at least one of the nodes other than the adjacent merger as each associate merger, to connect that each control objective node and this each associate merger, to add the at least one of nodes to the setup signal as a restoration path, and to transmit the setup signal with the at least one associate merger used as a fresh control objective node;

the restoration control means confirming responsive to the restoration guides the link resources between the associate merger used as each control objective node and one of the mergers that is not included in the at least one restoration path of the setup signal, to connect, when the last-mentioned link resources are usable, the associate merger and the above-mentioned one of mergers, to add this one of the mergers to the setup signal as a restoration path, and to transmit the setup signal with the last-mentioned one of mergers used as a fresh control objective node;

the restoration control means responding to the restoration guides to confirm the link resources between the associate merger used as each control objective node and an associate merger irrespective of presence and absence of the adjacent merger and to confirm, when the link resources are unusable and furthermore when the maximum allowable number is not exceeded by the associate merger included in the setup signal, the link resources between the above-mentioned each control objective node and the nodes other than the adjacent merger so as to connect, when the last-mentioned link resources are usable, the associate merger used as a control objective and at least one node other than the last-mentioned associate merger, to add the associate merger used as the control objective to the setup signal as a restoration path, and to transmit the setup signal with addition as a fresh control objective node of the node, namely, the associate merger satisfying condition;

selection and removal of the control objective node, assignment of the at least one restoration path, and transmission of the setup signal being repeated, until reception of the setup signal at one of the source and the destination nodes that is used as one of two terminal nodes of each current path subjected to the failure, to change this each current path to a restoration path indicated by the last-mentioned setup signal and to change the last-mentioned setup signal to a flag for transmission to the other of the terminal nodes;

selecting an eventually used restoration path to make the restoration control means of the nodes release the link resources other than one used for the eventually used restoration path at the source and the destination nodes that receive the last-mentioned setup signal and the flag in the above-mentioned each current path.

A fourth multi link type self healing system of this invention is characterised in the third multi link type self healing system in that:

the setup signal is transmitted from the control objective node to the associate merger with information of the associate merger added to the setup signal and with self heal operation thereafter carried out only relative to the associate merger excluded from the last-mentioned setup signal by confirmation and connection of the link resources and by transmission of the last-mentioned setup signal.

A fifth multi link type self healing system of this invention is characterised in the third multi link type self healing system in that:

a failure discriminator is defined in the setup signal with signal accumulating means assigned to the nodes of the network, the associate merger used as the control objective and supplied with the setup signal retrieving the signal accumulating means for continuation of self heal operation to accumulate a received setup signal in the signal accumulating means and for suspension of the self heal operation if a setup signal coincident with the received setup signal including the failure discriminator is not accumulated or if the setup signal coincident, even though accumulated, includes the associate merger less in number than the associate merger included in the received setup signal and otherwise, respectively.

A sixth multi link type self healing system of this invention is characterised in that the link resources and the restoration control means for self heal are used in self healing a plurality of current paths.

In accordance with this invention:

The setup signal is transmitted only between the control objective merger indicated by the restoration guides and an adjacent merger when an isolated failure takes place, if the restoration path is free from a fault and furthermore if sufficient link resources are available. This makes it unnecessary to transfer the control signal to all available adjacent nodes and reduces control signals necessary for the self heal.

Furthermore, the setup signal is supplemented with information relating to the associate merger used as a destination to transmit such a setup signal to the associate merger from the control objective node. This exempts from a transmission destination of the setup signal the associate merger included in the setup signal in subsequent self heal operation and reduces control signals necessary for the self heal.

In addition, the signal accumulating means is assigned to each node of the network with the failure discriminator defined. Used as the control object and receiving the setup signal, the associate merger retrieves whether or not the failure discriminator in question has already been dealt with. Irrespective of completion and not completion of dealing with, processing is continued only if the setup signal includes already dealt with associate mergers less in number than the associate mergers which are included at this instant. This reduces the control signals necessary for the self heal.

In the manner described above, the principles are connections between the mergers. As a consequence, the restoration path is established up to the number (usually, one or two) which is indicated by the restoration guides which are stored in the data base. Should a multiple failure take place, the restoration control means confirms connections between the merger and an associate merger, the associate merger and a merger, and associate mergers to try connection for reestablishment of only a section subjected to the failure in the restoration path rather than between the source and the destination nodes of the currently used path. Therefore, the self heal signal is not widely propagated but is transmitted to a restricted region. This makes it to avoid the unstable state and it unnecessary to assign the priority degree for coping with the multiple failure.

DESCRIPTION OF THE PREFERRED EMBODIMENTS

Figure 1:
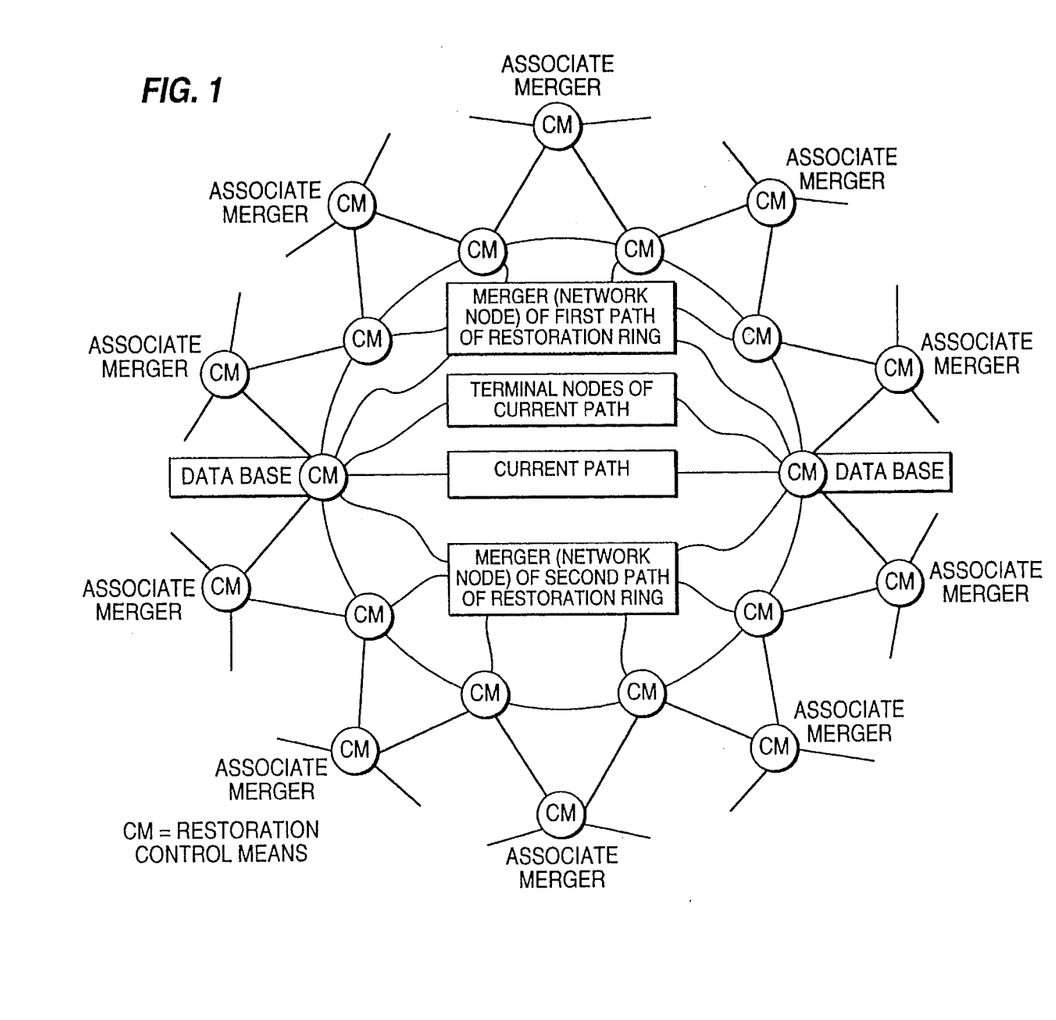
FIG. 1 is a diagram illustrative of an embodiment of the instant invention.

FIG. 1 shows an embodiment of the present invention as a network composed of a plurality of nodes assigned with cross-connect functions and a plurality of links connecting them. In order to offer a communication service between a source and a destination node, the cross-connect functions establish a path through at least one of the links. When established in an ordinary state, a path is herein called a current path. On establishing such current paths and for self heal of a failure, use is necessary of link resources, to which, for example, a link capacity and a logic path discriminator number correspond in a network of ATM (Asynchronous Transfer Mode). In a network of STM (Synchronous Transfer Mode), the link capacity serves as the link resources. Each node is assigned with restoration control means (CM) capable of confirming idleness, connecting, and releasing the link resources in each self heal procedure. In FIG. 1, attention is directed to one of the current paths with structures shown for use in self heal of the current path in question and with two terminal nodes of the current path included herein in mergers. During the self heal procedure of the current path, other nodes serve as mergers or associate mergers. The terminal nodes are accompanied by data bases, one of which is loaded with information indicative of mergers which are connected to one another into a first restoration path. The other is loaded with information of mergers used in a second restoration path. At the start of the self heal procedure, only the two terminal nodes of the current path have merger information for the self heal procedure in the network. It is decided by situations of the resources in the network and by transfer of control information among the nodes other than the source and the destination nodes of the current path whether or not such nodes actually serve as the mergers or the associate mergers.

Figure 2:
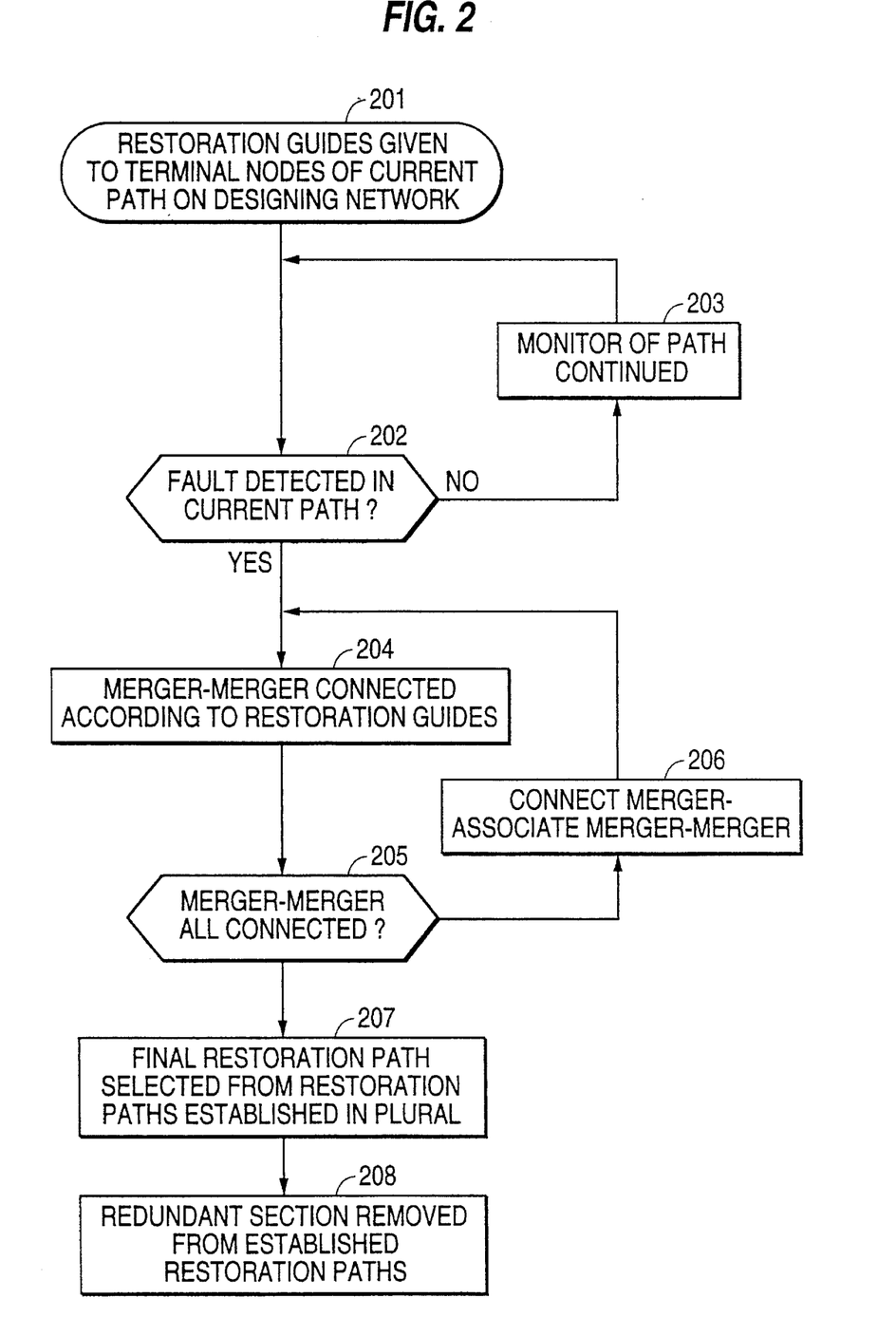
FIG. 2 is a diagram illustrative of the embodiment of this invention.

FIG. 2 shows main flows of the procedure in the embodiment of this invention. On designing the network, information of restoration guides is set in the data bases of the terminal nodes of each current path (step 201). The restoration guides are composed of a series of adjacent merger information indicative of a first or a second alternative route, the link resources for self heal of the current path, and a maximum allowable number of associate mergers which are allowed for inclusion on reestablishing the restoration path when it is impossible to connect the mergers for self heal. During the procedure, each terminal node always monitors the current path for detection of a failure in the current path (steps 202 and 203). When the failure is detected, each terminal node (a first merger) tries in compliance with its restoration guides to connect a series of adjacent mergers for establishment of the restoration path (steps 204 and 205). If it is impossible to connect through the adjacent mergers in compliance with the restoration guides due to a multiple failure, use of the associate mergers is tried to connect, for formation of a "merger - associate merger - merger" connection in place of a "merger - merger" connection, between the mergers which are indicated by the restoration guides and yet are impossible to connect (step 206). When the restoration path is reestablished from the associate merger to the merger, similar processes are repeated. If two or more restoration paths are established, a single path is selected for use in self heal in accordance with a predetermined reference (step 207). The link resources other than one used as a selected restoration path are released to complete the self heal procedure (step 208).

Figure 3:
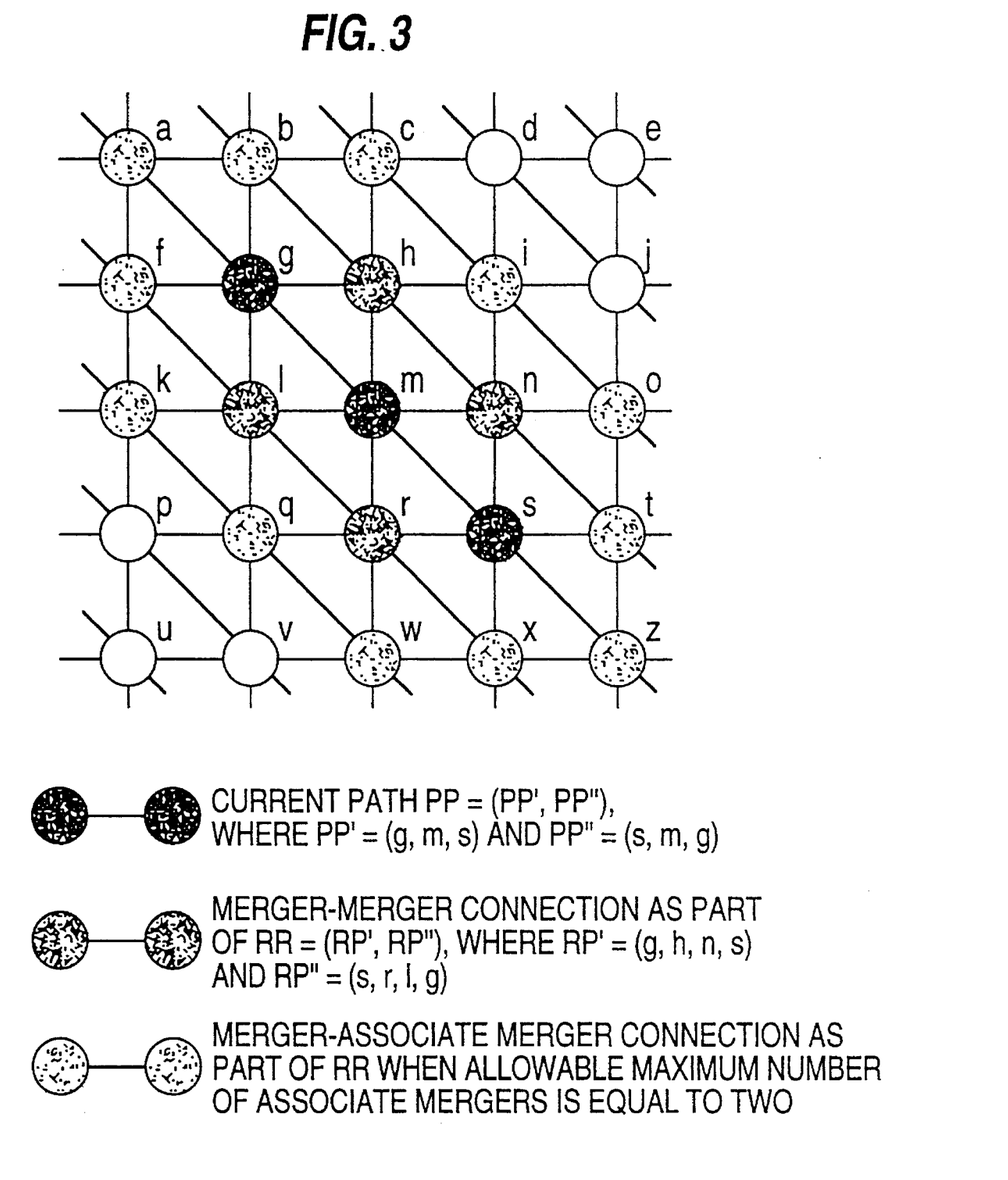
FIG. 3 is a diagram illustrative of relationships between a network structure and associate mergers of the embodiment of this invention.

Referring now to FIG. 3, the description will proceed in conjunction with the embodiment of this invention to relationships between a network structure decided upon design of the network and the associate mergers decided during the self heal. In the figure, the current path is PP=(PP', PP") with a source and a destination node g and s, where PP'=(g, m, s) and PP"=(s, m, g). With attention directed to directions relative to the current path and the restoration path, paths will hereafter be represented by X'/X" between the terminal nodes for different directions. Similar representations will be used for signals sent and received at the nodes. With the source and the destination nodes of the current path inclusive, that ring is referred to as a restoration ring, which logically establishes a closed ring. Those two restoration paths RP'=(g, h, n, s) and RP"=(s, r, l, g) will be taken into consideration which are composed through mergers with no duplication. For each of the RP' and RP", a maximum allowable number of the associate mergers is decided. As the restoration guides, the RP', the RP", the link resources necessary for the self heal, and the maximum allowable number of associate mergers are reported to the source and the destination nodes g and s of the current path and are stored in the data bases. When the maximum allowable number of associate mergers is equal to two, candidates of the associate mergers are a, b, c, i, o, t, f, k, g, w, x, and z.

The description will proceed below to a self heal algorithm for the nodes of the embodiments of this invention and to signals sent and received relative to adjacent nodes at three kinds of the terminal nodes of the current path, mergers other than the terminal nodes, and the associate mergers.

Figure 4A:
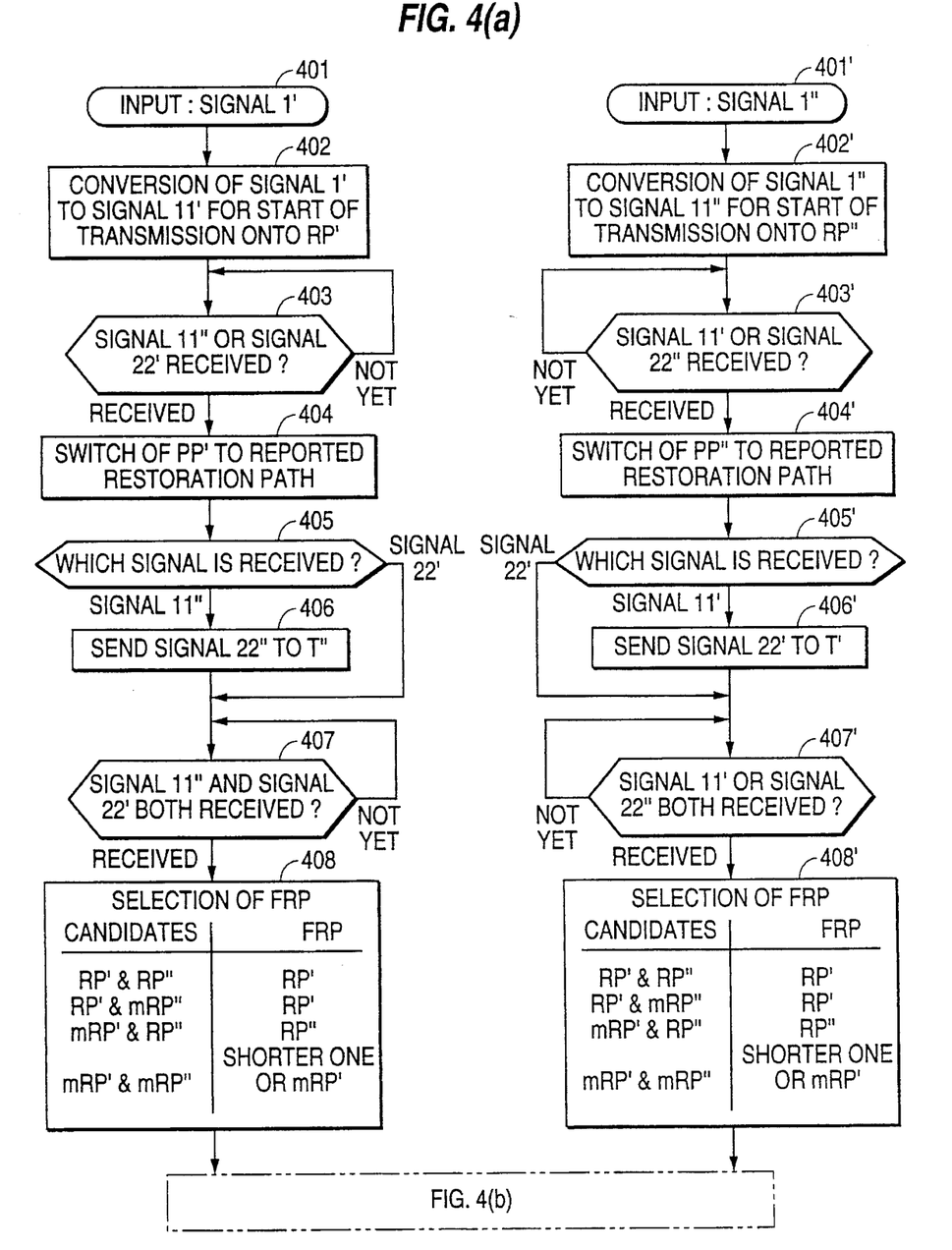
FIGS. 4(A) and 4(B) are diagrams illustrative of a self heal algorithm at a terminal node of a currently used path.
Figure 4B:
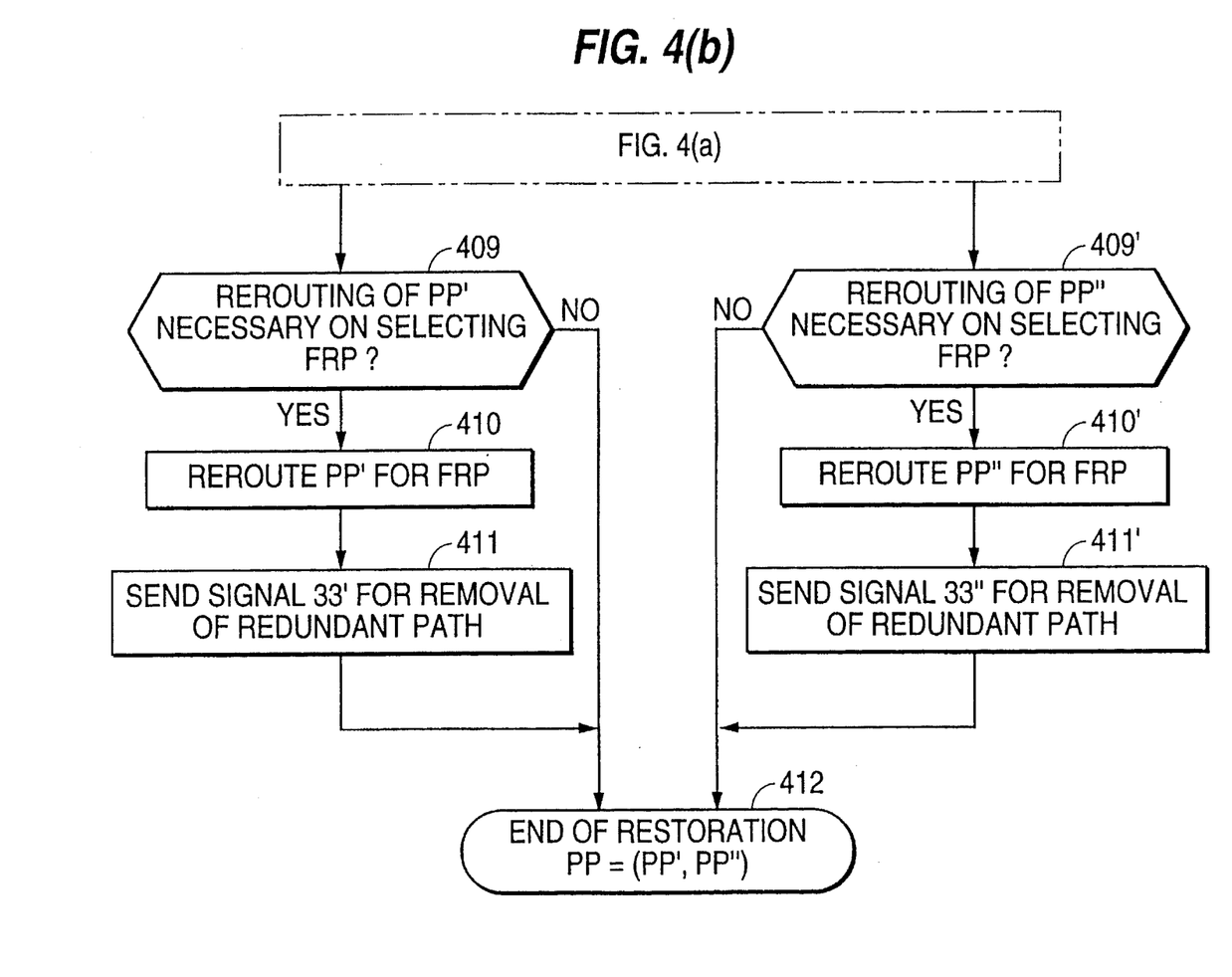

FIGS. 4(A) and 4(B) are illustrative of the self heal algorithm at the terminal nodes of the current path. Merely for simplicity of the description, a flow will be described relative to one terminal node T' alone with reference to the left side of the figure with the description omitted relative to the other terminal node T", operation of which is similar. The self heal starts when a signal 1' (a failure indication signal) is received at the terminal node T' (step 401). The terminal node T' is a first merger M' (1) of the RP' and a last merger M"(U) of the RP". The terminal node T" is a first merger M"(1) of the RP" and a last merger M'(V) of the RP'. Next, it is judged by the restoration control means in the manner to be described if the link resources at the merger to an adjacent merger is available. If available, the signal 1' is transformed for transmission to the adjacent merger into 11' (a setup signal) including the restoration guides as follows (step 402). The restoration guides are (a) a merger list {M'(v); v=1, . . . , V}, (b) the maximum allowable number, L', of associate mergers related to reestablishment of the RP', and (c) the link resources necessary for the self heal. Thereafter, the terminal node T' waits for reception of either a signal 11" or a signal 22' (a first acknowledge signal) (step 403). When the signal 11" is received, the terminal node T' switches the current path PP into either the RP" or to mRP" depending on the circumstances (step 404) and sends a signal 22" to the terminal node T" (steps 405 and 406). When the signal 22' is received, the terminal node T' switches the current path PP either to the RP' or to mRP' (the step 404) and sends no signals to the terminal node T" (the step 405). In the foregoing, mRP'/mRP" represent the restoration paths which are reestablished during progress of the self heal with the associate merger used. The signal 22' and the signal 22" are sent in order to convey path information for restoring traffics of the current path PP' and the current path PP". Subsequently, reception of both the signal 11" and the signal 22' is waited for (step 407). After reception, selection of a final restoration path (FRP) is started as follows. At the terminal node T', the FRP is selected from the two restoration paths based on a reference that is as follows (step 408). (1) If the RP' is already got, the RP' is selected as the FRP. (2) If the mRP' and the mRP" are got, the RP" is selected as the FRP. (3) If the mRP' and the mRP" are not got, selected as the FRP is one that has a less number of links and is the mRP' when the links are equal in number, respectively. When it is necessary by the above-described selection of the FRP to again switch (step 409) the RP' into which switched, switching again is into the FRP (step 410). In addition, a signal 33' (a first release signal) is sent (step 411) to the other terminal node T'" in order to release the link resources for redundant restoration paths to complete the self heal (step 412).

Figure 5A:
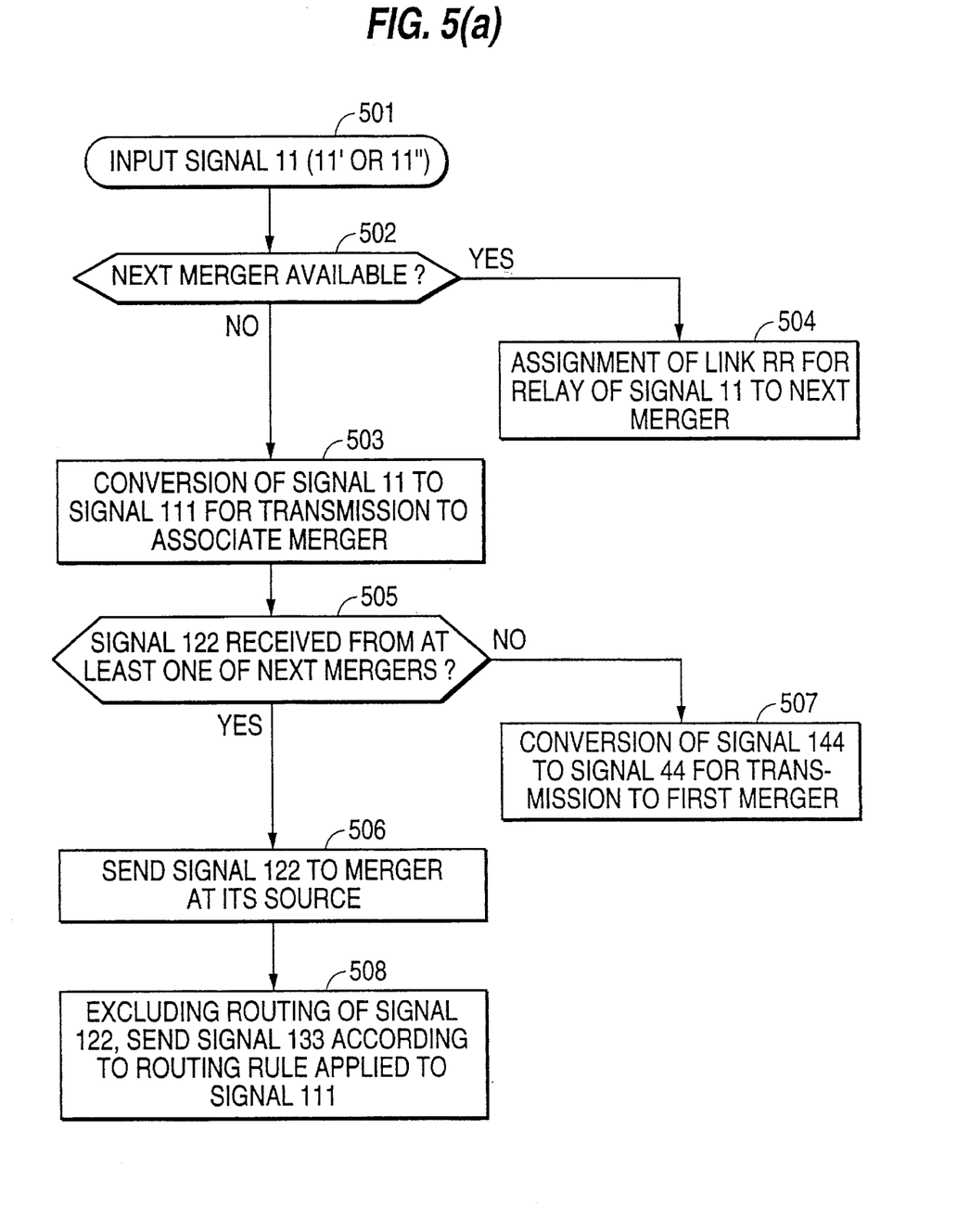
FIGS. 5(A), 5(B), and 5C illustrative of self heal algorithms at merger/nodes.
Figure 5B:
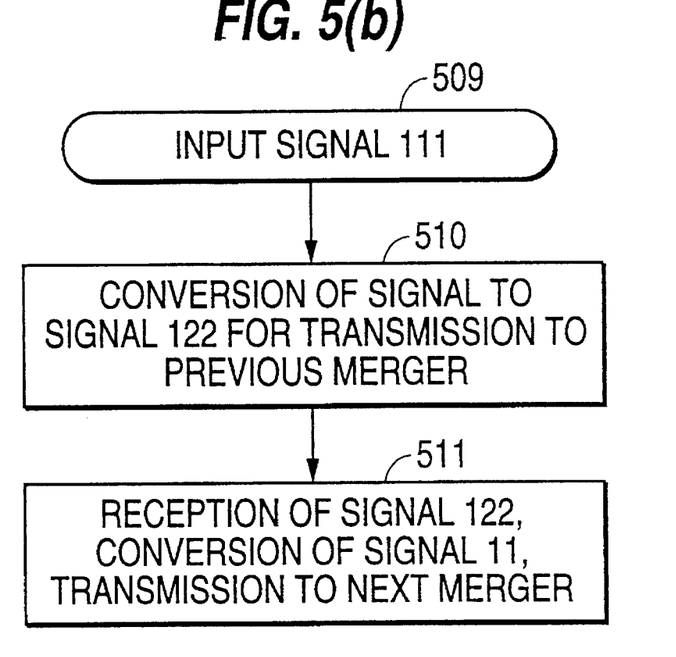
Figure 5C:
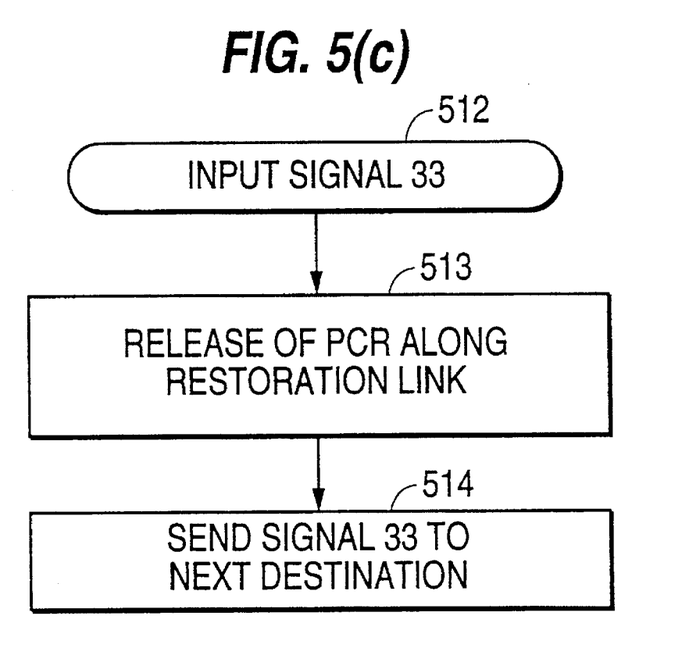

FIGS. 5(A), 5(B), and 5(C) show self heal algorithms at merger/nodes. In FIG. 5 (A) illustrative of an ordinary processing algorithm at the mergers and a processing algorithm which give rise problems due to a restoration path which involves a fault or the like and is reestablished at the mergers. When a signal 11 is received (step 501), the restoration control means of a merger M(k) confirms (step 502) the link resources for connection to a next adjacent merger M(k+1). If allowed, a connection is established to send the signal 11 to the M(k+1) (ordinary procedure: step 504). If connection to the M(k+1) is impossible, a connection possible associate merger is searched for among adjacent nodes other than the M(k+1) such as one that satisfy conditions (b) and (c) of the restoration guides. The signal 11 is converted to a signal 111 (a spread signal), which is sent to the connection possible associate merger (step 503) in order to search for, as a destination, one of mergers {M(u); u=k+1, . . . , U}. Supplied with the signal 111 through the associate merger, a merger M(n) sends a signal 122 (a second acknowledge signal) back to the merger M(k) at which reestablishment starts. Receiving the signal 122 earliest, the merger M(k) sends the signal 122 again to the M(n) (step 506). Subsequently, the merger M(k) sends a signal 133 (a second release signal) through a route similar to that for the signal 111 to release redundant link resources which are connected for reestablishment of the restoration path (step 508). If the merger M(k) does not receive the signal 122 at all from a subsequent merger, a signal 44 (a first nondelivery signal) is converted, for transmission (step 507) to a first merger M(1), to a signal 144 (a second nondelivery signal) which will later be described. FIG. 5 (B) illustrates an algorithm for processing during progress of reestablishment of the restoration path at the merger of the signal 111 which returns to the restoration route. The merger M(n) converts the signal 111 supplied thereto to the signal 122 for transmission back through a propagation route of the signal 111 to the merger M(k) at which the reestablishment of the restoration path starts. This transmission of the signal 122 is to inform of completion of the reestablishment of a part of the RP which is subjected to the failure. Receiving the signal 122 for the first time, the merger M(k) sends this received signal 122 back to the merger M(n) for acknowledgement (step 510). The merger M(n) converts the signal 122 supplied thereto to the signal 11 to try transmission to a subsequent merger M(n+1) (step 511). At this time, the reestablishment of RP comes to an end. FIG. 5 (C) illustrates an algorithm for sending a signal 33 (another first release signal) successively to adjacent mergers to remove redundant restoration paths which are not selected as the FRP (steps 512 to 514).

Figure 6A:
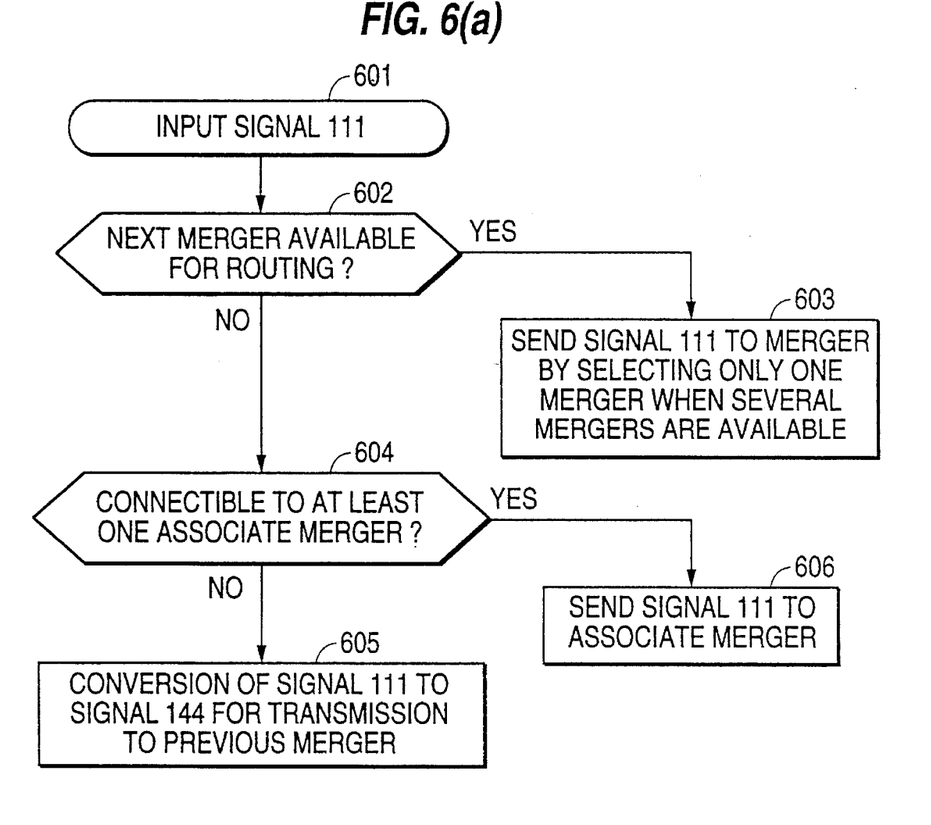
FIGS. 6A, 6B and 6C is illustrative of self heal algorithms at associate merger/nodes.
Figure 6B:
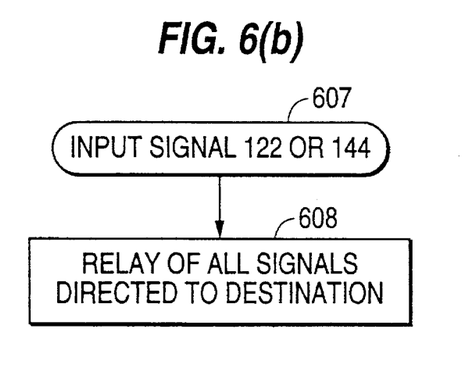
Figure 6C:
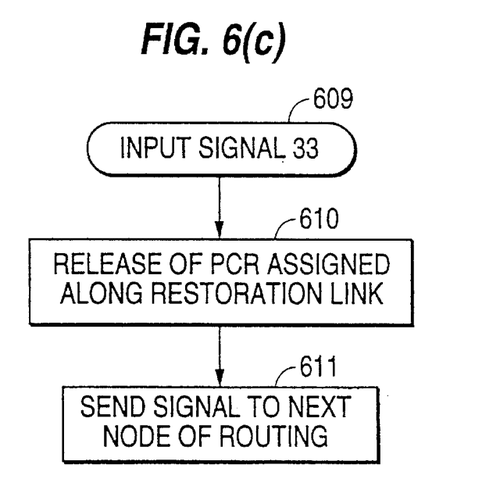

FIGS. 6(A), 6(B), and 6(C) show self heal algorithms at the associate merger. FIG. 6 (A) illustrates a processing algorithm at the associate merger involved in the reestablishment of restoration path. Receiving the signal 111 (step 601) and for transmission (step 603) of the signal 111 only to a connection possible merger, an associate merger AM(j) searches for (step 602) one of adjacent mergers {M (u); u=k+1, . . . , U } that can be connected in view of condition (c) of the restoration guides. When a plurality of connection possible mergers are present, one is selected that is, for example, a remotest merger from the merger M(k) at which the reestablishment starts. On the other hand, it will be assumed that the associate merger AM(j) can be connected to no mergers. If present, an adjacent node which satisfies conditions (b) and (c) for the restoration guides and is allowed for connection, is used as an associate merger for transmission of the signal 111 thereto (steps 604 and 606). If no associate mergers are available, the associate merger AM(j) converts the signal 111 to a signal 144 (a second nondelivery signal) for send back to the associate merger M(k) at which the reestablishment of restoration path starts (steps 604 and 605). FIG. 6 (B) illustrates an algorithm for sending the signal 122 or the signal 144 to a pertinent direction at the associate merger (steps 607 to 608). FIG. 6 (C) illustrates a processing algorithm of the signal 133 for releasing the redundant restoration paths (steps 609 to 611).

Figure 7:
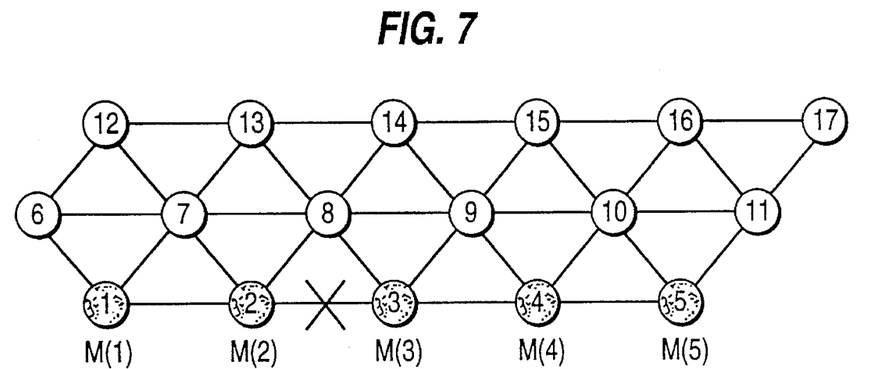
FIG. 7 is a diagram illustrative of a network topology for other embodiments of this invention.

Improvements will be described in the processing algorithms at the mergers and the associate mergers of this invention. FIG. 7 illustrates an example of network topologies to which directed are embodiments described below herein, a series of mergers {M(1), M(2), M(3), M(4), M(5)} are used as objectives of the restoration path RP. It is assumed that sufficient link resources are available in the network. It is furthermore assumed that a maximum allowable merger number L is equal to six.

Figure 8:
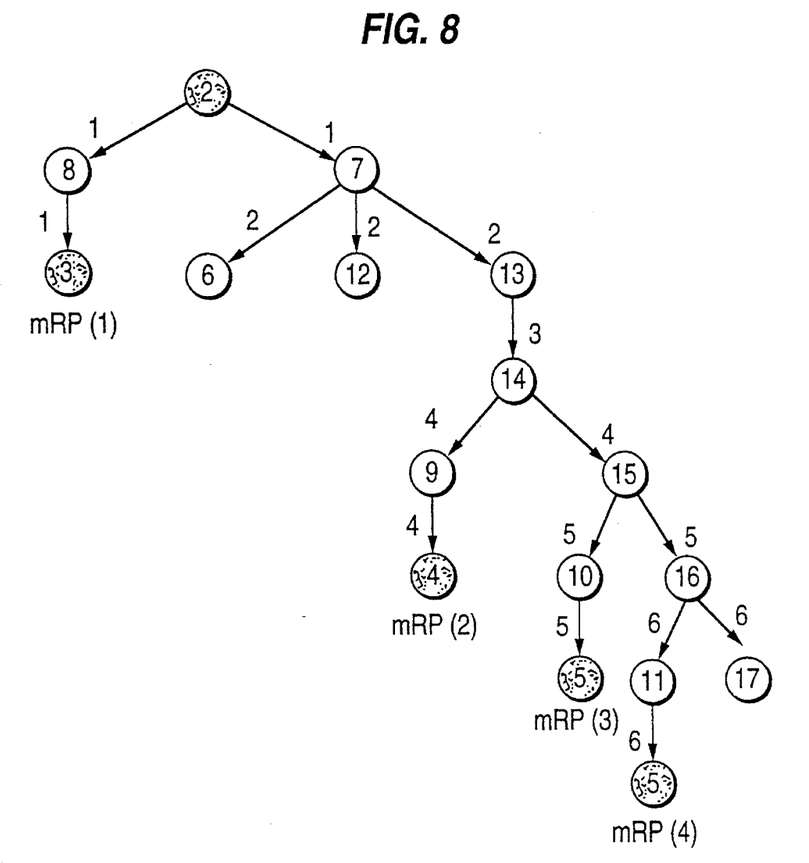
FIG. 8 is a diagram illustrative of one of the other embodiments of this invention.

FIG. 8 illustrates an example of reestablishing the restoration path according to an embodiment of this invention in a form of tree information with the merger M(2) used as a starting point. In this embodiment wherein the merger M(k) and the associate merger AM(j) are used to start the reestablishment of restoration path and as one related to the reestablishment, respectively, it is presumed that the signal 111 is sent to a new associate merger for connection with the signal 111 supplemented with new merger information for connection. In addition, the fact is added to a reference for judgment for the new associate merger that the associate merger is not included in the signal 111. Indicated along branches are numerals representative of the number of the associated mergers involved in the reestablishment. Supplied with the signal 11 from the M(1), the M(2) can not be connected to the M(3) due to a link fault. The reestablishment of RP therefore starts at the M(2) to send the signal 111 to nodes 7 and 8. A destination of the signal 111 is the M(3), the M(4), or the M(5). In the manner depicted in the figure, the node 8 is supplied with the signal 111 and sends the signal 111 to the M(3) alone. Consequently, this reestablished restoration path mRP(1) includes one associate merger. The node 7 is supplied with the signal 111 and sends the signal to nodes 6, 12, and 13 and not to the node 8 because the node 8 is included in the signal 111 and is an inhibited associate merger. At this stage, such inhibited mergers become the nodes 7, 8, 6, 12, and 13. Subsequently receiving the signal 111, the node 13 sends the signal 111 to a node 14 alone. Supplied with the signal 111, the node 14 sends the signal 111 with nodes 9 and 15 used as associate mergers. For the node 9 supplied with the signal 111, the M(3) and M(4) serve as candidates of mergers to which connection is possible. The M(4) is remoter than the M(3) from the M(2) at which the reestablishment of restoration path starts. The signal is consequently sent to the M(4) alone. In this reestablished restoration path mRP(2), the nodes 7, 13, 14, and 9 are included as four associate mergers. Similar processes are repeated. It is to be noted that, at the nodes 6 and 12 having no nodes for connection and at a node 17 where the maximum allowable number (L=6) is exceeded, the signal 111 is converted to the signal 144 for send back to the node M(2). When first supplied with the signal 122 including route information 2 - 8 - 3 of the reestablished restoration path mRP(1), the merger M(2) selects this restoration path and sends the signal 133 for release of the redundant link resources to that particular route through which the signal 111 is propagated.

Figure 9:
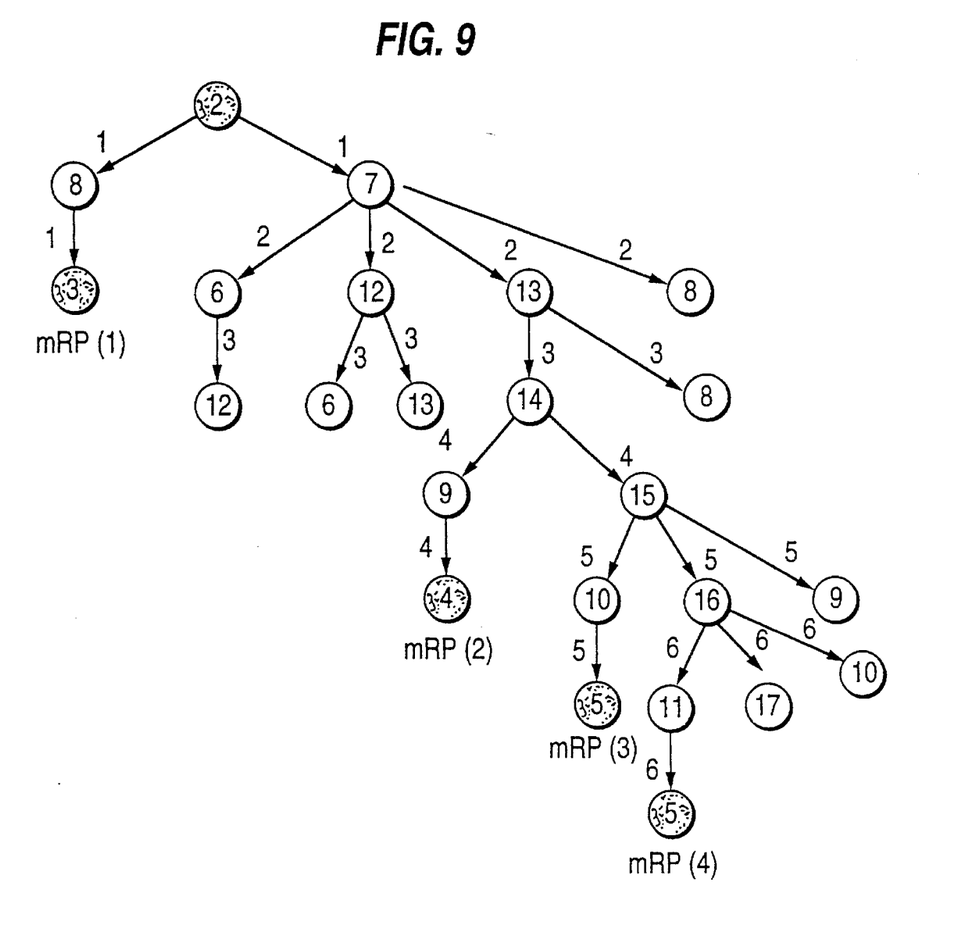
FIG. 9 is a diagram illustrative of a different one of the other embodiments of this invention.

A different embodiment will be described in connection with another improvement in the processing algorithm at the mergers and the associate mergers of this invention. In accordance with this embodiment, a failure discriminator is defined in the signal 111. Signal accumulating means is assigned to the nodes in the network. Receiving the signal 111 and serving as a control objective, the associate merger retrieves the signal accumulating means of this node for continuation of self heal operation to accumulate the signal 111 in the signal accumulating means and for suspension of the self heal operation either if the signal 111 is not accumulated to be identical with the signal 111 including the failure discriminator or if this identical signal 111, even though accumulated, includes the associate mergers less in number than the associate mergers included in the signal 111 and otherwise, respectively. FIG. 9 illustrates an example of reestablishing the restoration path according to this invention in tree information where the merger M(2) serves as a start point. Inasmuch as whether self heal should be continued or suspended is judged after arrival at the associate merger and retrieval of contents of the signal accumulating means, the associate mergers are greater in number by one than those used in FIG. 8 in a propagation route in which processing is suspended. More particularly, the associate mergers are greater in number by a last node as exemplified by (2, 7, 6, 12), (2, 7, 12, 6), (2, 7, 12, 13), (2, 7, 8), (2, 7, 13, 8), (2, 7, 13, 14, 15, 9), or (2, 7, 13, 14, 15, 16, 10).

Referring to FIGS. 10(A) through 10(F), the embodiment will be described as regards self heal for a typical example of the network shown in FIG. 3. A double failure will be assumed in FIG. 3 at a link (h - n) and at the node m. The self heal is executed independently in connection with the current paths subjected to influences. The description will proceed about a bidirectional current path PP=(PP', PP") between the nodes T' (=g) and T" (=s), with an assumption such that two restoration paths RP'=(g, h, n, s) and RP"=(s, r, q, l) are set for the current path upon design of the network. The self heal will be described in six steps of (1) start of restoration, (2) assignment of the RP', (3) assignment of the RP", (4) rerouting of the PP, (5) selection of a final restoration path, and (6) release of redundant restoration paths.

(1) Start of restoration: The failure indication signals 1' and 1" are converted at the node g to the 11' and at the node s to the 11", respectively. By the signal 11" sent are merger list information of the restoration path RP', the maximum allowable number (two in the example being illustrated) of associate mergers which can be included in the restoration path mRP', and the link resources necessary for restoration of the current path. Similar information is sent by the signal 11'.

(2) Assignment of the RP': It is possible to use the transmitted link resources in a link (g - h) (FIG. 10 (A)). A connection of a merger/merger (M - M) type is consequently established. The link (h - n) is subjected to a failure in a next stage of the RP'. The node h therefore converts the signal 11' to a signal 111' for transmission to the associate mergers b, c, and i. With information of the associate mergers included in the signal 111', three candidates for reestablishment of the restoration path of a merger/associate merger/merger (M - AM - M) connection type are simultaneously formed (FIG. 10 (B)). Receiving the signal 111', the associate merger b first searches for presence and absence of the merger node n or s in its adjacent nodes a and c and subsequently an associate node. In this case, the node c is already indicated by the received signal 111' as a selected associate merger. As a result, only the node a is selected as a new associate merger to assign a link (b - a) for delivery of the signal 111' to the node a (FIG. 10 (C)). The node a serves as a second associate merger included in the reestablished restoration path. Inasmuch as its adjacent node does not serve as the merger node n or s, the signal 111' is converted to a signal 144' for transmission back to the merger h through a route backwardly directed relative to towards the node a (FIG. 10 (D)). Similarly, the signal 111' is sent from the node h first to the node c and then from the node c to the node d (FIG. 10 (C)). Inasmuch as the merger node n or s is not present at its adjacent nodes, the signal 111' is converted to the signal 144' for transmission back to the merger h through a backwardly directed route (FIG. 10 (D)). Receiving the signal 111' from the node h, the associate merger i finds the merger n from its adjacent nodes. If the resources of a link (i - n) between these nodes are usable, the signal 111' is sent to the merger n (FIG. 10 (C)). In this case, the merger n converts the signal 111' to a signal 122' for transmission back to the node h through a backwardly directed route (FIG. 10 (D)). Receiving the signal 122', the merger h varies its propagation direction for transmission again to the merger n. Subsequently, the signal 122' is removed to send a signal 133' to routes through which the signal 111' is previously sent. Receiving the signal 133', each associate merger releases the link resources connected during the reestablishment of restoration path. Receiving the signal 122', the merger n converts the signal 111' to the signal 11' for transmission to a final merger s of the RP'. It will be presumed that the merger s receives the signal 11' before the signal 22". The merger s converts the signal 11' to the signal 22' for transmission to the merger g (FIG. 10 (E)).

(3) Assignment of the RP": All link resources are usable when related to the RP". The restoration path is consequently established by connecting the mergers through routes. This assignment of the RP" comes to an end when the last merger g of the RP" receives the signal 11". The merger g converts the signal 11" to the signal 22" for transmission to a start merger s of the RP".

(4) Rerouting of the PP: Receiving the signal 11" before the signal 22', the terminal node g of the PP switches the traffic from the PP to the RP". When the signals are received in a reversed order, the traffic is switched to the mRP'. Receiving the signal 11' prior to the signal 22", the terminal node s of the other PP switches the traffic from the PP to the mRP'. When the signals are received in a reversed order, the traffic is switched to the RP".

(5) Selection of a final restoration path: Receiving the signal 22', the terminal node g selects the RP" as the FRP in accordance with the selection reference described before. Similarly receiving the signal 22", the terminal node s switches back to the RP" if the traffic passes through the mRP' when switched as above.

Figure 10A:
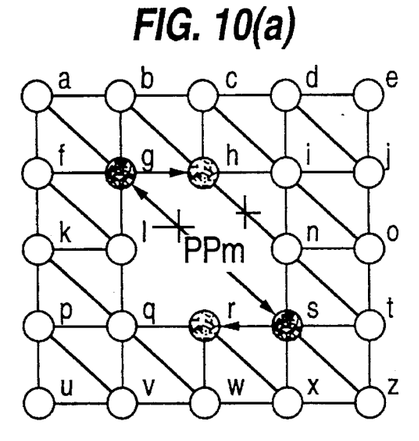
FIGS. 10(A), 10(B), 10(C), 10(D), 10(E) and 10(F) are diagrams illustrative of the different one of the other embodiments of this invention.
Figure 10B:
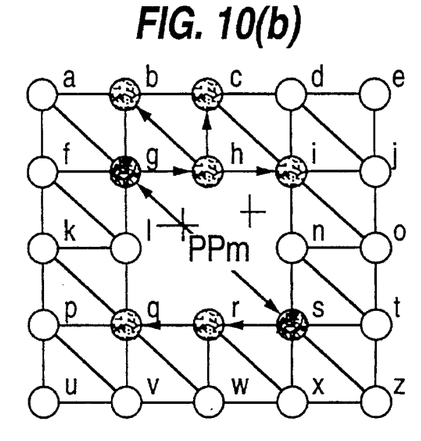
Figure 10C:
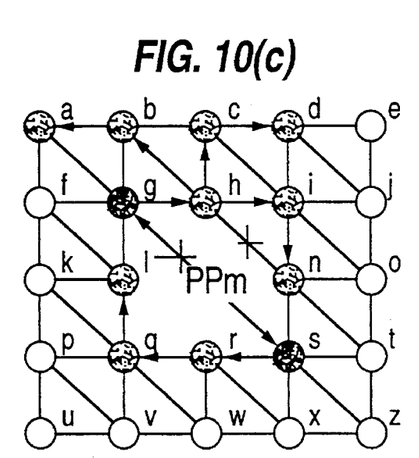
Figure 10D:
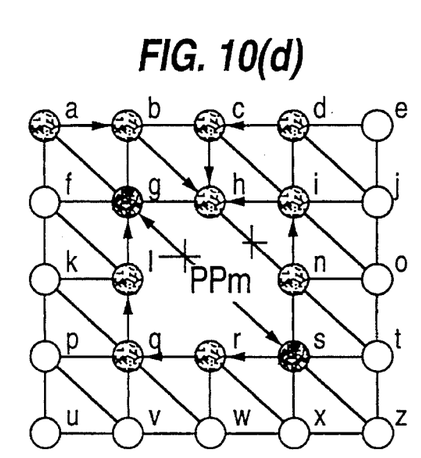
Figure 10E:
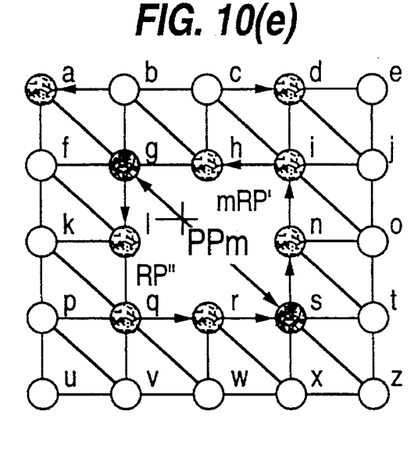
Figure 10F:
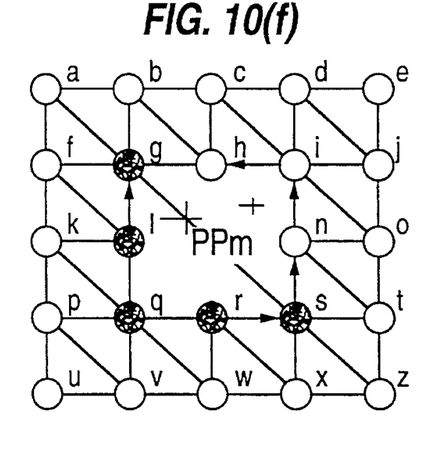

(6) Release of redundant restoration paths: After selection of the FRP, the terminal merger s sends a signal 33' to release the link resources used in the mRP' (FIG. 10 (F)).

(Merits of the Invention)

In the manner thus far described, the self healing system of this invention achieves technical merits as follows.

(1) The restoration path is designed and indicated preliminarily by centralized processing to effectively and commonly use network resources. This makes it possible to economically assign reserved resources for the self heal.

(2) The current path is switched to the restoration path by propagation of the setup signal from one of the terminal nodes to the other of the mergers. This makes it possible to restore the failure at a high speed.

(3) It is possible to selectively propagate the setup signal to reduce control signals in number. This enables to shorten the time of restoration when the restoration path is distributedly reestablished.

(4) A node or a link for establishment of a preliminarily assigned restoration path is subjected to a fault in a multiple failure. It is possible even in this event to restore the multiple failure by distributedly reestablishing the restoration path.

(5) It is possible upon occurrence of a multiple failure to try the reestablishment with only use as an objective of a section subjected to each failure in the restoration path rather than use of the section between those and the destination nodes of the current path. Consequently, a self heal signal is not propagated to a wide area but is closed in a restricted area. This makes it possible to avoid an unstable state and it easy to administrate the self heal with no attention directed to its priority degree.

(6) It is possible to cope with the self heal in compliance with various reliability requirements only by loading the restoration paths of a number responding to a required level of the current path.

What is claimed is:

1. A multi link type self healing system for a communication network composed of a plurality of nodes assigned with cross-connect functions and a plurality of links connecting said nodes to provide current paths, each current path being between a source and a destination node of said nodes through at least one of said links, the improvement wherein:

each of said current paths is accompanied by at least one restoration path represented by a merger list composed of the source and the destination nodes of said each current path and the nodes other than the nodes included in said each current path, the source and the destination nodes of said each current path and the nodes other than the nodes included in said each current path being denoted as mergers;

each of the source and the destination nodes of said each current path is provided with a data base loaded with information necessary for restoration of a corresponding one of said each current path as an alternative route between the source and the destination nodes of said corresponding one of said each current path when said corresponding one of said each current path fails;

said nodes comprising restoration control means for confirming, connecting, and releasing resources of ones of said links that are connected in order to set up said alternative route in said communication network for passing data between the source and the destination nodes of said corresponding one of said each current path that fails;

said data base is loaded with restoration guides comprising for said current paths said merger list, link resources necessary for restoration of said failure, and, when said restoration path is unusable on restoration of said failure, a maximum allowable number of associate mergers for use in reestablishing said restoration path;

a failure indication signal indicative of said one of said current paths is changed to a setup signal including said restoration guides to use the source and the destination nodes of said each current path as control objective nodes and to begin assignment of said at least one restoration path at said control objective nodes;

said restoration control means confirming, responsive to said restoration guides, said link resources between the merger used as each control objective node and an adjacent merger to connect a link section if said link resources are usable, to add said control objective nodes to said setup signal as a restoration path, and to transmit said setup signal with said adjacent merger used as a fresh control objective node;

said restoration control means confirming, responsive to said restoration guides, said link resources between the merger used as each control objective node and an adjacent merger to use, if said link resources are not usable but if the link resources relative to the nodes other than said adjacent merger are usable, at least one of the nodes other than said adjacent merger as each associate merger, to connect said each control objective node and said each associate merger, to add said at least one of the nodes to said setup signal as a restoration path, and to transmit said setup signal with said at least one associate merger used as a new control objective node;

said restoration control means confirming, responsive to said restoration guides, said link resources between the associate merger used as each control objective node and one of said mergers that is not included in said at least one restoration path of said setup signal, to connect, when the last-mentioned link resources are usable, said associate merger and said one of said mergers, to add said one of said mergers to said setup signal as a restoration path, and to transmit said setup signal with said one of said mergers used as the new control objective node;

said restoration control means is responsive to said restoration guides to confirm said link resources between the associate merger used as each control objective node and an adjacent merger irrespective of a presence and an absence of said adjacent merger and to confirm, when said link resources are unusable and furthermore when said maximum allowable number is not exceeded by the associate mergers included in said setup signal, the link resources between said each control objective node and the nodes other than said adjacent nodes so as to connect, when the last-mentioned link resources are usable, the associate merger used as a control objective and at least one node other than the last-mentioned associate merger, to add the associate merger used as said control objective to said setup signal as a restoration path, and to transmit said setup signal with addition as the new control objective node of the node, namely, the associate merger, satisfying condition;

selection and renewal of said control objective node, assignment of said at least one restoration path, and transmission of said setup signal are repeated, until reception of said setup signal at one of said source and said destination nodes that is used as one of two terminal nodes of each current path subjected to said failure, to change said each current path to a restoration path indicated by the last-mentioned setup signal and to change the last-mentioned setup signal to a flag for transmission to the other of said terminal nodes;

said restoration control means of said nodes selecting an eventually used restoration path and releasing the link resources other than one used for said eventually used restoration path at said source and said destination nodes that receive the last-mentioned setup signal and said flag in said each current path.

2. A multi link type self healing system as claimed in claim 1, wherein:

said setup signal is transmitted from said control objective node to said associate merger with information of said associate merger added to said setup signal and with self heal operation thereafter carried out only relative to the associate merger excluded from the last-mentioned setup signal by confirmation and connection of said link resources and by transmission of the last-mentioned setup signal.

3. A multi link type self healing system as claimed in claim 2, wherein said link resources and said restoration control means for self heal are used together in self healing a plurality of said current paths.

4. A multi link type self healing system as claimed in claim 1, wherein:

a failure discriminator is defined in said setup signal with signal accumulating means assigned to the nodes of said communications network, the associate merger used as said control objective and supplied with said setup signal retrieving said signal accumulating means for continuation of self heal operation to accumulate a received setup signal in said signal accumulating means and for suspension of said self heal operation if a setup signal coincident with the received setup signal including said failure discriminator is not accumulated or if this identical setup signal, even though accumulated, includes the associate merger less in number than the associate merger included in said received setup signal and otherwise, respectively.

5. A multi link type self healing system as claimed in claim 4, wherein said link resources and said restoration control means for self heal are used together in self healing a plurality of said current paths.

6. A multi link type self healing system as claimed in claim 1, wherein said link resources and said restoration control means for self heal are used together in self healing a plurality of said current paths.

7. A multi link type self healing system as claimed in claim 1, wherein the link resources include at least one of a link capacity and a logic path discriminator number when said communications network is an asynchronous transfer mode network.

8. A multi link type healing system as claimed in claim 1, wherein the link resources include a link capacity when said communications network is a synchronous transfer mode network.

9. A multi link type self healing system for a communication network composed of a plurality of nodes assigned with cross-connect functions and a plurality of links connecting said nodes to provide current paths, each current path being between a source and a destination node of said nodes through at least one of said links, the improvement wherein:

each of said current paths is accompanied by at least one restoration path represented by a merger list composed of the source and the destination nodes of said each current path and the nodes other than the nodes included in said each current path, the source and the destination nodes of said each current path and the nodes other than the nodes included in said each current path being denoted as mergers;

each of the source and the destination nodes of said each current path is provided with a data base loaded with information necessary for restoration of a corresponding one of said each current path as an alternative route between the source and the destination nodes of said corresponding one of said each current path when said corresponding one of said each current path fails;

said nodes comprising restoration control means for confirming, connecting, and releasing resources of ones of said links that are connected in order to set up said alternative route in said communication network for passing data between the source and the destination nodes of said corresponding one of said each current path that fails;

self heal control signals accumulated in said data base with said restoration path inclusive are sent and received between mergers of said restoration path when a failure takes place in said one of said current paths;

said restoration control means establishes for restoration said alternative route in said at least one restoration path for said one of said current paths that fails;.

said self heal control signals are sent and received between a merger and the nodes other that said merger when said at least one restoration path can not be used as said alternative route;

said restoration control means utilizing at least one of the mergers in the merger list for restoration of said corresponding one of said each current path that fails, by establishing said alternative route in place of said corresponding one of said each current path that fails;

said data base is loaded with restoration guides comprising for said current paths said merger list, link resources necessary for restoration of said failure, and, when said restoration path is unusable on restoration of said failure, a maximum allowable number of associate mergers for use in reestablishing said restoration path;

a failure indication signal indicative of said one of said current paths is changed to a setup signal including said restoration guides to use the source and the destination nodes of said each current path as control objective nodes and to begin assignment of said at least one restoration path at said control objective nodes;

said restoration control means confirming, responsive to said restoration guides, said link resources between the merger used as each control objective node and an adjacent merger to connect a link section if said link resources are usable, to add said control objective nodes to said setup signal as a restoration path, and to transmit said setup signal with said adjacent merger used as a fresh control objective node;

said restoration control means confirming, responsive to said restoration guides, said link resources between the merger used as each control objective node and an adjacent merger to use, if said link resources are not usable but if the link resources relative to the nodes other than said adjacent merger are usable, at least one of the nodes other than said adjacent merger as each associate merger, to connect said each control objective node and said each associate merger, to add said at least one of the nodes to said setup signal as a restoration path, and to transmit said setup signal with said at least one associate merger used as a new control objective node;

said restoration control means confirming, responsive to said restoration guides, said link resources between the associate merger used as each control objective node and one of said mergers that is not included in said at least one restoration path of said setup signal, to connect, when the last-mentioned link resources are usable, said associate merger and said one of said mergers, to add said one of said mergers to said setup signal as a restoration path, and to transmit said setup signal with said one of said mergers used as the new control objective node;

said restoration control means is responsive to said restoration guides to confirm said link resources between the associate merger used as each control objective node and an adjacent merger irrespective of a presence and an absence of said adjacent merger and to confirm, when said link resources are unusable and furthermore when said maximum allowable number is not exceeded by the associate mergers included in said setup signal, the link resources between said each control objective node and the nodes other than said adjacent nodes so as to connect, when the last-mentioned link resources are usable, the associate merger used as a control objective and at least one node other than the last-mentioned associate merger, to add the associate merger used as said control objective to said setup signal as a restoration path, and to transmit said setup signal with addition as the new control objective node of the node, namely, the associate merger, satisfying condition;

selection and renewal of said control objective node, assignment of said at least one restoration path, and transmission of said setup signal are repeated, until reception of said setup signal at one of said source and said destination nodes that is used as one of two terminal nodes of each current path subjected to said failure, to change said each current path to a restoration path indicated by the last-mentioned setup signal and to change the last-mentioned setup signal to a flag for transmission to the other of said terminal nodes; and said restoration control means of said nodes selecting an eventually used restoration path and releasing the link resources other than one used for said eventually used restoration path at said source and said destination nodes that receive the last-mentioned setup signal and said flag in said each current path.

* * * * *